C. H. SIES.
HAY LOADER.
APPLICATION FILED MAY 11, 1908.
972,132.
Patented Oct. 4, 1910.
2 SHEETS—SHEET 1.
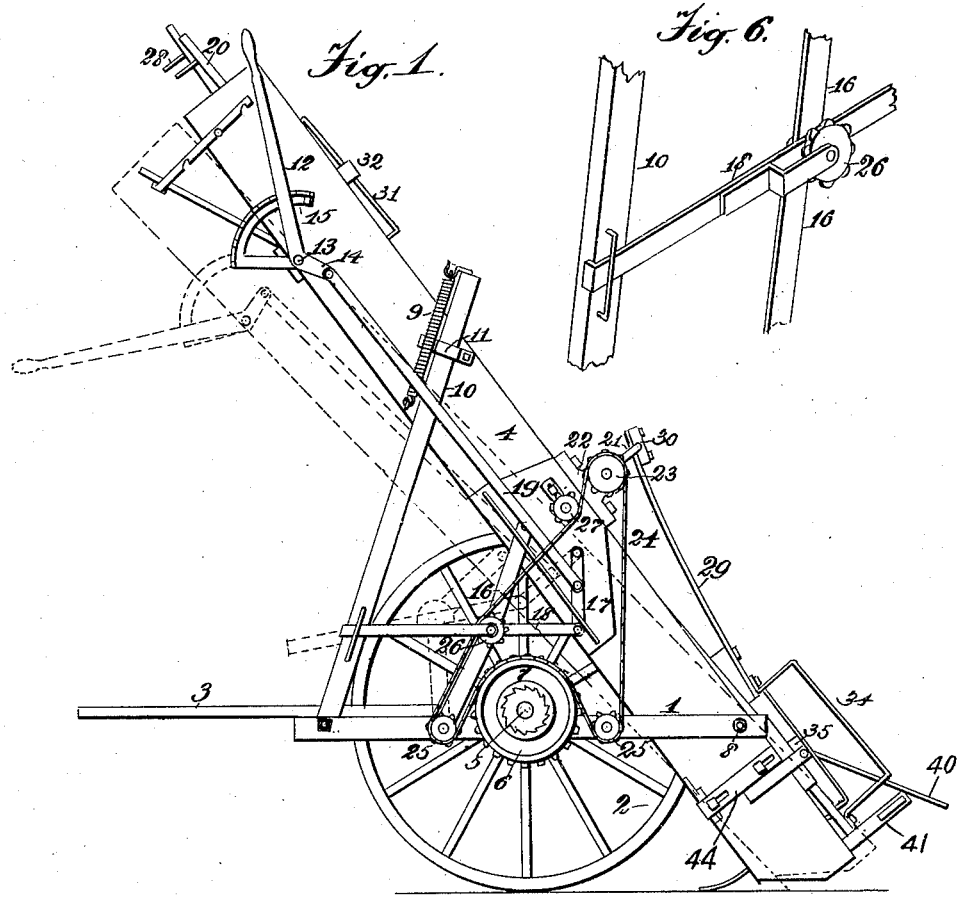
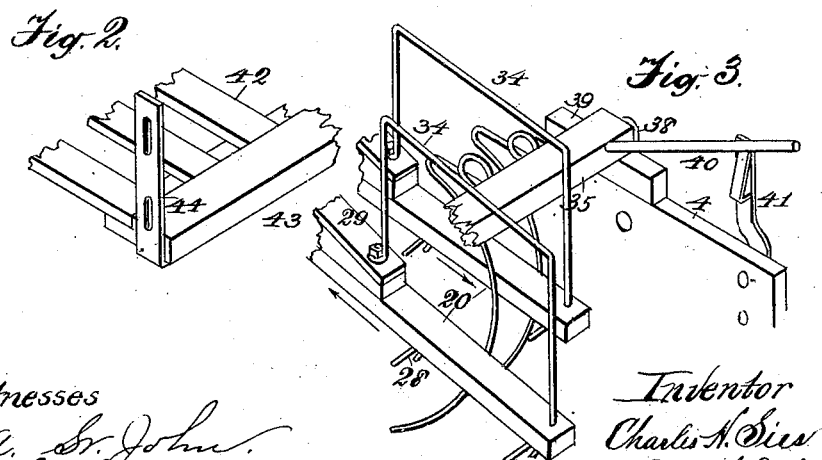
Witnesses
L. A. St. John.
J. L. Clarke
Inventor
Charles H. Sies
By J. M. St. John,
Atty.

C. H. SIES.
HAY LOADER.
APPLICATION FILED MAY 11, 1908.

972,132.

Patented Oct. 4, 1910.

2 SHEETS—SHEET 2.

Witnesses
L. A. St. John
J. L. Clarke

Inventor
Charles H. Sies
By J. M. St. John
Atty.

UNITED STATES PATENT OFFICE.

CHARLES H. SIES, OF CEDAR RAPIDS, IOWA, ASSIGNOR OF ONE-HALF TO B. F. SIES, OF DAVENPORT, IOWA.

HAY-LOADER.

972,132.  Specification of Letters Patent.  Patented Oct. 4, 1910.

Application filed May 11, 1908. Serial No. 432,328.

*To all whom it may concern:*

Be it known that I, CHARLES H. SIES, a citizen of the United States, residing at Cedar Rapids, in the county of Linn and State of Iowa, have invented certain new and useful Improvements in Hay-Loaders; and I do hereby declare the following to be a full, clear, and exact description of the invention, such as will enable others skilled in the art to which it appertains to make and use the same.

The object of this invention is to improve the construction of hay-loaders so as to secure the following desirable results: To provide a novel and efficient drive for the rake-bars. To so construct and arrange the carrying mechanism as to admit of its being tilted according to the height of the load. To provide a rake for gathering the hay from the ground and a series of elevating rake-bars coöperating therewith, embodying novel and useful features hereinafter to be fully set forth.

Minor improvements will appear in the description following.

Figure 4:
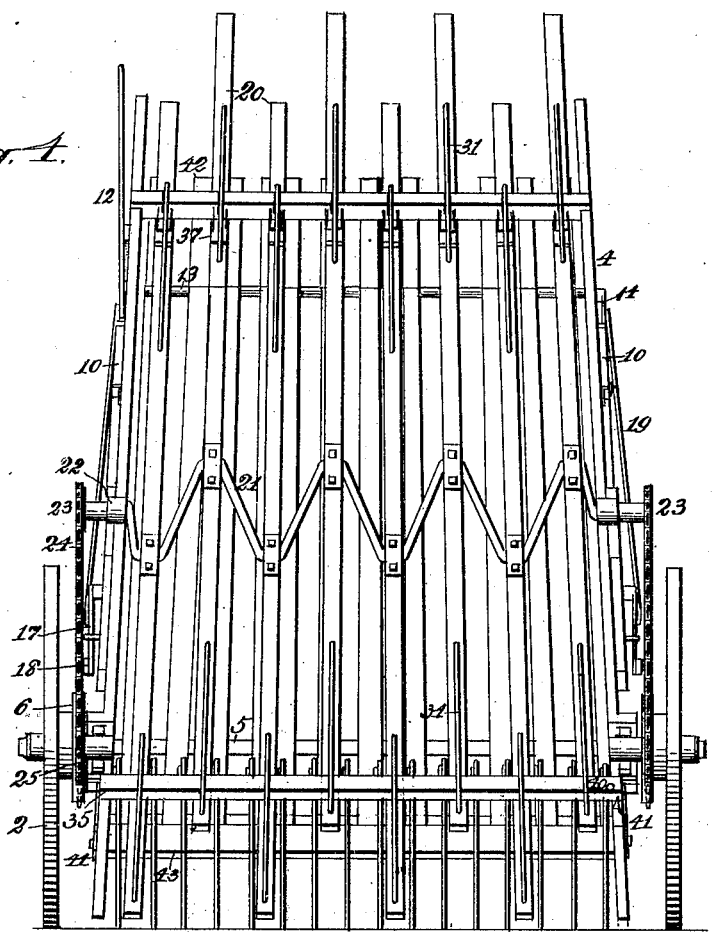
Figure 5:
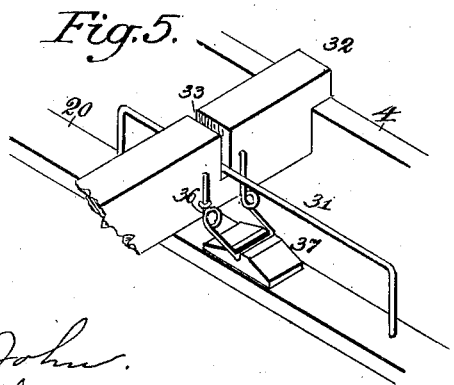

In the drawings, forming a part of this specification, Figure 1 is a side elevation of a hay-loader embodying my invention, with one of the traction wheels removed. Fig. 2 is a detail in perspective, showing a device for adjusting the bottom of the carrier or elevator. Fig. 3 is a similar view showing the construction of the gathering and elevating rakes. Fig. 4 is a rear elevation of the machine. Fig. 5 is a detail in perspective, showing the mounting of the rake-bars near their upper ends. Fig. 6 shows details of the tilting mechanism.

In the drawings the numeral 1 denotes the main frame mounted in the usual way on a pair of drive-wheels 2, and provided with the coupling reach or tongue 3. On this frame is mounted the hay-carrier or elevator body 4. The main axle 5 is provided near each end with a sprocket 6, to which motion is imparted by ratchet mechanism 7 in the manner so familiar as to need no particular description.

Instead of being rigidly attached to the main frame, the carrier is pivoted thereto at 8, so that the upper end of the carrier may tilt up or down, as indicated by the dotted outline. The forward and upper part of the carrier is supported on springs 9 attached to standards 10 adjacent to the sides of the carrier, and held slidably in position by stirrups 11. Near the upper end of the carrier is mounted a hand-lever 12 attached to a shaft 13 crossing the carrier. At each end of the shaft is a short lever 14. A suitable sector 15 serves to hold the lever at any desired position. Near the middle, the carrier connects with the main frame with pairs of toggle levers 16, whose position is controlled by the hand-lever. In practice it is more convenient to connect indirectly rather than directly, and accordingly a short lever 17 is pivoted to the side of the carrier, and to the free end of this lever is pivoted a link 18 connecting with said toggle-levers. A bar or rod 19 transmits motion from the hand-lever to the lever 17, and thence to the toggle-levers. When in normal position the latter are nearly in a right line, and so locked, the better to support the carrier. When deflected, as indicated by the dotted lines, the upper end of the carrier is depressed. This is a matter of much convenience, especially in windy weather, as it admits of the hay being dropped at the upper end close to the load, the carrier being elevated from time to time as the load grows in height.

The rake-bars 20, to be more fully described hereafter are given a reciprocating motion by a multiple crank-shaft 21 mounted in bearings 22, and provided with sprockets 23. These sprockets are driven in a direction reverse to the movement of the sprockets 6 by a sprocket chain 24, which, instead of passing under the sprockets 6 is carried under a pair of idler sprockets 25 and thence over the top of the sprockets 6. Each chain also passes over a sprocket 26 at the joint of each pair of toggles, and by this means the chains are not slackened or tightened by the movement of the carrier up or down. Suitable idlers 27 are also provided, and made adjustable according to the length or stretch of the chains.

To the alternating cranks or the crank-shaft are attached the rake-bars 20. These are provided with simple teeth 28 to catch the hay as gathered by the gathering rake, and advance it to the top of the carrier. As the lower ends of these rake-bars are carried near to the ground at each revolution of the crank-shaft, there has been, in hay-loaders of this type, frequent breakage, due to the lower end of a bar striking a stone or other obstruction on the down stroke. To prevent this, and to give the bar an elastic yet efficient action on the hay, each rake bar is attached to its crank not directly, but by a long flat spring 29, provided with a suitable bearing 30. The spring may be of wood (preferably on account of lightness) or steel, and while strong enough to give sufficient pressure of the rake-bar on the hay beneath, its elasticity prevents breakage under any circumstances.

The rake-bars are mounted independently of each other by means of the following mechanism: Near the upper end of each bar is a stirrup 31, preferably of steel, of a length corresponding to the stroke of the rake-bar, and of a depth suited to the load of hay the rake-bar is required at any time to elevate. Between these stirrups and the rake-bars to which they are fastened is a cross-bar 32 provided with a series of gains or notches 33, deep enough to engage the stirrup even when the bar is at its most elevated position as regards the bottom of the carrier. The stirrups thus serve as guides for the rake-bars, and the bottoms of the gains, in connection with the stirrups, prevent the teeth from striking the bottom slats of the carrier. Similar stirrups 34 are provided near the lower ends of the rake-bars, but lateral guides are not here necessary, as the cranks serve for this purpose. At this point the rake-head 35 serves to limit the movement of the bars to and from the bottom of the carrier. At the upper cross-bar a spring 36 is placed over each rake-bar, and engages a notch in a shoe 37, under which the rake-bar slides. This imparts the proper pressure to the rake-bar at the upper end, while the spring connection of the cranks does the same for the lower end, as already described.

The mounting of the gathering rake is shown in Figs. 1 and 3. To the sides of the carrier are attached plates 38, and to the upper ends of these plates is pivoted the rake-head 35, near its downward side. When in normal position the forward side of the rake-head rests on blocks 39, and the rake is thus prevented from turning farther backward. To the rake-head is attached a hand-lever 40, and in the path of this, attached to the side of the carrier, is a spring catch 41. By throwing the lever down until the catch engages it the rake is lifted free from the ground, as is desirable, except when the machine is in use. The rake-head is provided with a series of curved, spring-steel teeth, 45, adapted to gather the hay from the ground. Between these teeth the rake-bars move back and forth as actuated by the multiple crank-shaft, and as indicated by the arrows in Fig. 3. In moving backwardly and downwardly each rake-bar is raised at the lower end, with respect to the bottom of the carrier, and this action tends to carry the bar over the continually rising and accumulating bunch of hay in the gathering rake. As the bars move upwardly toward the load, however, their teeth catch the hay, and so advance it step by step toward the top of the carrier.

The bottom of the carrier is composed of a series of slats 42 attached at the lower end to a cross-bar 43. The ends of this cross-bar are secured to slotted side-plates 44 bolted to the sides of the carrier body. By this means the carrier bottom may be adjusted up or down to suit the capacity of the carrier to light or heavy grass, as desired.

Having thus described my invention, I claim:

1. In a hay-loader having carrying wheels and means for attaching the loader to the rear of a wagon, the combination of a supporting frame, a carrier body pivoted thereto, supporting standards adjacent to the carrier, springs connecting said carrier with the upper ends of said standards, and means for gathering hay from the ground.

2. In a hay-loader having carrying wheels, means for attaching the loader to the rear of a wagon and chain driving mechanism substantially as described, the combination of a supporting frame, a carrier mounted thereon by pivot joints, jointed levers pivotally connecting the frame and carrier at each side, means for actuating said levers, sprockets carried by said jointed levers, chains connecting said sprockets with the driving mechanism and means for gathering hay from the ground substantially as and for the purpose set forth.

3. In a hay-loader having carrying wheels, means for attaching the loader to the rear of a wagon and sprocket and chain drive-gear, substantially as described, the combination of a supporting frame, a carrier pivoted thereto, jointed levers connecting the carrier and the frame, an auxiliary lever pivoted to the carrier, a link connecting said lever with the center joint of the hinged levers, a sprocket at said joint, another sprocket at the frame joint, a chain engaging said sprockets and the driving mechanism, means adapted to deflect said jointed levers, and means for gathering hay from the ground substantially as and for the purpose set forth.

4. In a hay-loader having carrying wheels and means for attaching the loader to the rear of a wagon, the combination of a multiple crank shaft, a series of rake-bars, springs connecting the rake-bars and cranks, and means for gathering hay from the ground.

5. In a hay-loader having carrying wheels and means for attaching the loader to the rear of a wagon, the combination of a multiple crank shaft, a series of rake-bars, flat springs attached to said rake-bars, bearings near the upper ends of said springs to connect them with the cranks, and means for gathering hay from the ground.

6. In a hay-loader having carrying wheels and means for attaching the loader to the rear of a wagon, the combination of a series of reciprocating rake-bars, guide-stirrups attached thereto near their upper ends, a grooved cross-bar to coact with said stirrups, spring-pressed shoes to ride on the upper sides of said rake-bars, and means for gathering hay from the ground.

7. In a hay-loader, a carrier having a bottom movable at the lower end, slotted side-plates connected therewith, means for securing said plates adjustably to the sides of the carrier, and means for gathering hay from the ground.

In testimony whereof I affix my signature in presence of two witnesses.

CHARLES H. SIES.

Witnesses:
L. A. St. John,
J. M. St. John.